US012793995B2

(12) United States Patent
Bonakdarpour et al.

(10) Patent No.: US 12,793,995 B2
(45) Date of Patent: Nov. 10, 2026

(54) MEMBRANE ELECTRODE ASSEMBLY

(71) Applicant: Johnson Matthey Hydrogen Technologies Limited, London (GB)

(72) Inventors: Arman Bonakdarpour, Vancouver (CA); Lius Daniel, Vancouver (CA); David Wilkinson, Vancouver (CA)

(73) Assignee: Johnson Matthey Hydrogen Technologies Limited, London (GB)

( * ) Notice: Subject to any disclaimer, the term of this patent is extended or adjusted under 35 U.S.C. 154(b) by 1112 days.

(21) Appl. No.: 17/634,836

(22) PCT Filed: Oct. 2, 2020

(86) PCT No.: PCT/GB2020/052417

§ 371 (c)(1),
(2) Date: Feb. 11, 2022

(87) PCT Pub. No.: WO2021/064410

PCT Pub. Date: Apr. 8, 2021

(65) Prior Publication Data

US 2022/0302486 A1 Sep. 22, 2022

(30) Foreign Application Priority Data

Oct. 4, 2019 (GB) ..................................... 1914335

(51) Int. Cl.

| | |
|---|---|
| ***H01M 8/1004*** | (2016.01) |
| ***H01M 4/86*** | (2006.01) |
| ***H01M 4/88*** | (2006.01) |
| ***H01M 4/96*** | (2006.01) |

(52) U.S. Cl.
CPC ....... *H01M 8/1004* (2013.01); *H01M 4/8605* (2013.01); *H01M 4/8668* (2013.01); *H01M 4/8807* (2013.01); *H01M 4/96* (2013.01)

(58) Field of Classification Search
CPC ............. H01M 8/1004; H01M 4/8605; H01M 4/8668; H01M 4/8807; H01M 4/96
See application file for complete search history.

(56) References Cited

U.S. PATENT DOCUMENTS

2009/0317686 A1 12/2009 Huston et al.
2010/0279196 A1* 11/2010 Kim .................... H01M 8/1004 429/483
2012/0034548 A1* 2/2012 Okuyama ........... H01M 4/8807 429/480
2014/0315121 A1* 10/2014 Ghielmi .............. H01M 8/1018 429/534
2019/0305323 A1* 10/2019 Kishimoto .............. H01M 4/90

FOREIGN PATENT DOCUMENTS

CA 2 954 704 A1 1/2016
EP 1775788 A1 4/2007
JP 2002-260686 A 9/2002
JP 2005-310660 A 11/2005
(Continued)

*Primary Examiner* — Olatunji A Godo
(74) *Attorney, Agent, or Firm* — BakerHostetler

(57) ABSTRACT

The present invention provides a process for preparing a membrane electrode assembly in which a microporous layer is applied to a catalyst layer. Also provided are membrane electrode assemblies obtainable by applying a macroporous layer to a catalyst layer.

9 Claims, 5 Drawing Sheets

(56) References Cited

FOREIGN PATENT DOCUMENTS

| | | | |
|---|---|---|---|
| JP | 2008-276949 | A | 11/2008 |
| JP | 2019-186205 | A | 10/2019 |
| WO | 01/80342 | A1 | 10/2001 |
| WO | 2008/091330 | A2 | 7/2008 |
| WO | 2015/118323 | A1 | 8/2015 |

* cited by examiner

MEMBRANE ELECTRODE ASSEMBLY

FIELD OF THE INVENTION

The present invention provides a process for preparing a membrane electrode assembly, and a membrane electrode assembly obtainable by the process. The membrane electrode assembly contains a microporous layer which is applied to a catalyst layer.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly, which is essentially composed of five layers. The central layer is the polymer ion-conducting membrane. On either side of the ion-conducting membrane there is a catalyst layer, containing an electrocatalyst designed for the specific electrolytic reaction. Finally, adjacent to each catalyst layer there is a gas diffusion layer. The gas diffusion layer must allow the reactants to reach the catalyst layer and must conduct the electric current that is generated by the electrochemical reactions. Therefore, the gas diffusion layer must be porous and electrically conducting.

The catalyst layers generally comprise an electrocatalyst material comprising a metal or metal alloy suitable for the fuel oxidation or oxygen reduction reaction, depending on whether the layer is to be used at the anode or cathode. The electrocatalyst is typically based on platinum or platinum alloyed with one or more other metals. The platinum or platinum alloy catalyst can be in the form of unsupported nanoparticles (such as metal blacks or other unsupported particulate metal powders) but more conventionally the platinum or platinum alloy is deposited as higher surface area nanoparticles onto a high surface area conductive carbon material, such as a carbon black or heat-treated versions thereof.

The catalyst layers also generally comprise a proton conducting material, such as a proton conducting polymer, to aid transfer of protons from the anode catalyst to the membrane and/or from the membrane to the cathode catalyst.

Conventionally, the membrane electrode assembly can be constructed by a number of methods. Typically, the methods involve the application of one or both of the catalyst layers to an ion-conducting membrane to form a catalyst coated membrane. Subsequently, a gas diffusion layer is applied to the catalyst layer. Alternatively, a catalyst layer is applied to a gas diffusion layer to form a gas diffusion electrode, which is then combined with the ion-conducting membrane. A membrane electrode assembly can be prepared by a combination of these methods e.g. one catalyst layer is applied to the ion-conducting membrane to form a catalyst coated ion-conducting membrane, and the other catalyst layer is applied as a gas diffusion electrode.

Typical gas diffusion layers include a gas diffusion substrate and a microporous layer. The gas diffusion substrate can be, for example, a non-woven paper or web comprising a network of carbon fibres and a thermoset resin binder, or a woven carbon cloth, or a non-woven carbon fibre web. The gas diffusion substrate is typically modified with a particulate material coated onto the face that will contact the catalyst layer, this material is the microporous layer. The particulate material is typically a mixture of carbon black and a hydrophobic polymeric binder such as polytetrafluoroethylene (PTFE). The microporous layer has several functions including enabling water and gas transport to and from the catalyst layer. The microporous layer is electrically conductive and is able to transfer heat away from the electrochemical reaction sites.

The benefits of microporous layers have been attributed to enhancement of the back diffusion of liquid water from the cathode to anode [1-3] and by limitation of the growth of liquid water droplets that would block gas access to the catalyst layer [4-6]. However, several imaging studies with optical profilometry [7,8], cryogenic fracturing [9,10], and X-ray microtomography have shown the presence of interfacial gaps (up to ~10 μm) at the catalyst layer|microporous layer interface which lead to an increase in ohmic resistance of the membrane electrode assembly and to mass transport losses [11-13]. The presence of interfacial gaps can result in water accumulation at the catalyst layer|microporous layer interface. One approach to reduce water accumulation at the catalyst layer|microporous layer interface has been to directly deposit the catalyst layer onto the microporous layer of a gas diffusion layer during production of membrane electrode assemblies, instead of applying the catalyst layer to the ion-conducting membrane [10]. The resulting gas diffusion electrode is then applied to an ion-conducting membrane. This fabrication route has some drawbacks however. Catalyst applied to the microporous layer may end up in deep pores within the gas diffusion layer leading to performance losses caused by long proton conduction pathways between the catalyst and the ion-conducting membrane. In addition, the lamination pressure that can be applied to bond the catalyst layer to the ion-conducting membrane is lower in this design, because high bonding pressure will cause mechanical damage to the gas diffusion substrate structure, such as the breakage of fibres. Modification of microporous layer properties [14-17] and the addition of perforation holes in the microporous layer and/or gas diffusion substrate [18-20], see also U.S. Pat. No. 9,461,311 B2 and U.S. Pat. No. 8,945,790 B2, have previously been reported as a possible solution to minimize performance loss but none of these approaches can physically eliminate the existing gaps at the microporous layer to catalyst layer interface.

There remains a need for fuel cells which benefit from the presence of microporous layers but in which the drawbacks of microporous layers are minimized, especially during operation at high current densities.

SUMMARY OF THE INVENTION

Accordingly, the present invention provides a process for preparing a membrane electrode assembly, said process comprising the steps of:

i) preparing a dispersion comprising carbon particles and a polymeric binder; then ii) applying the dispersion to a catalyst layer of a catalyst coated ion-conducting membrane to form a microporous layer A comprising the carbon particles and the polymeric binder on the catalyst layer; then either a) applying a gas diffusion substrate to the microporous layer A after step ii); or b) applying a microporous layer B to the microporous layer A after step ii).

In step ii) b), the microporous layer B can be applied to microporous layer A as an individual layer, or in combination with a gas diffusion substrate as a gas diffusion layer.

The present invention also provides a membrane electrode assembly obtainable by the process of the invention.

Also, the present invention provides a membrane electrode assembly comprising a gas diffusion substrate, a microporous layer A comprising carbon particles and a polymeric binder, a catalyst layer, and an ion-conducting membrane, wherein no less than 95% of a surface of microporous layer A is in contact with a surface of the catalyst layer, and wherein said gas diffusion substrate, microporous layer A and catalyst layer are present at one side of the ion-conducting membrane.

The term "side" in this context will be understood by a skilled person. The ion-conducting membrane has an x,y-plane, and a through-thickness z-plane. The two sides of the ion-conducting membrane are separated by the thickness. Conventionally, one side will be the anode side, and the other side will be the cathode side.

For avoidance of doubt, the term "microporous layer A" used herein refers to a microporous layer which is/has been applied directly to a catalyst layer as a single layer, not in combination with a gas diffusion substrate as part of a gas diffusion layer, by the methods disclosed herein. It will be understood that a "gas diffusion substrate" does not include a microporous layer in this disclosure. The term "gas diffusion layer" used herein means the combination of a gas diffusion substrate and a microporous layer.

The invention also provides a fuel cell comprising a membrane electrode assembly of the invention.

Fuel cells containing membrane electrode assemblies of the present invention have improved electrochemical properties, especially at high current densities, compared to fuel cells containing membrane electrode assemblies in which the microporous layers are applied by conventional methods. The membrane electrode assemblies of the invention also preserve the benefits associated with the use of microporous layers.

BRIEF DESCRIPTION OF THE DRAWINGS

FIG. 3(*b*) is a plot showing high frequency resistance measured at 2.5 kHz for the same membrane electrode assemblies as FIG. 3(*a*)

FIG. 3(*c*) is a plot showing voltage vs current density for the same membrane electrode assemblies as FIG. 3(*a*), under both $H_2$/air and $H_2/O_2$ under fully humidified conditions. There is no correction for internal resistance in the plot.

FIG. 3(*d*) shows cyclic voltammograms performed under $H_2/N_2$ for membrane electrode assemblies according to the invention, as well as comparative membrane electrode assemblies. The figure also includes electrochemically active surface area values for these membrane electrode assemblies, derived from the voltammograms.

FIG. 4(*b*) is a plot showing high frequency resistance measured at 2.5 kHz for the same membrane electrode assemblies as FIG. 4(*a*).

FIG. 4(*c*) is a plot showing voltage vs current density for the same membrane electrode assemblies as FIG. 4(*a*). There is no correction for internal resistance in the plot.

FIG. 5(*b*) is a plot showing high frequency resistance measured at 2.5 kHz for the same membrane electrode assemblies as FIG. 5(*a*).

FIG. 5(*c*) is a plot showing voltage vs current density for the same membrane electrode assemblies as FIG. 5(*a*). There is no correction for internal resistance in the plot.

DETAILED DESCRIPTION

Figure 1:
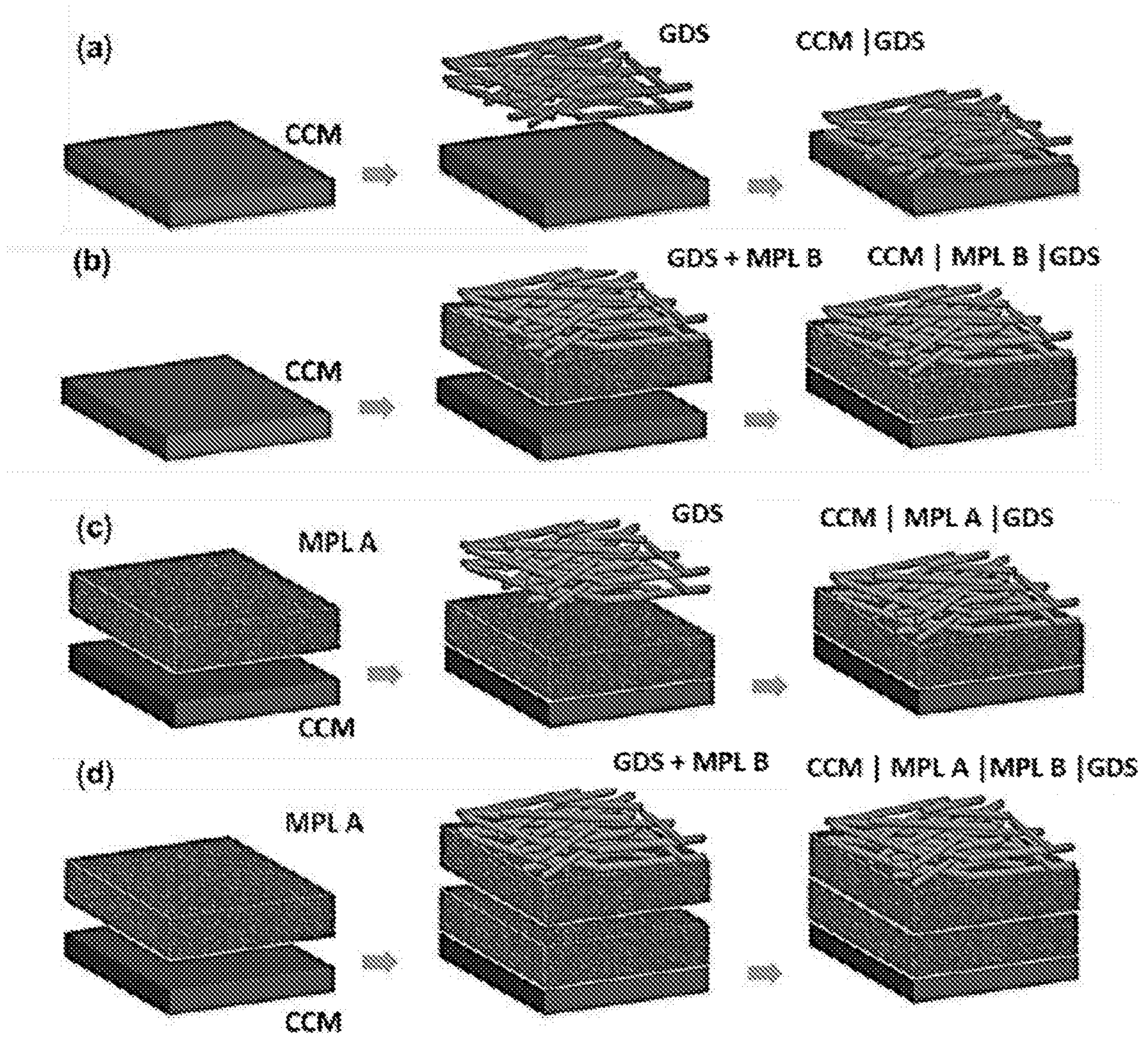
FIG. 1 shows schematics of one side of different membrane electrode assembly architectures (layer thickness not to scale), and their preparation: (a) without a microporous layer, (b) with a microporous layer, prepared by a conventional route (c) with a microporous layer A, prepared in accordance with the invention, and (d) with microporous layers A and B, prepared in accordance with the invention. CCM=catalyst coated ion-conducting membrane, MPL=microporous layer, GDS=gas diffusion substrate.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise. Unless otherwise stated, refence herein to membrane electrode assemblies of the invention also includes membrane electrode assemblies which are the subject of the process of the invention.

Microporous layer A contains carbon particles. Suitably, the carbon particles are any finely divided form including carbon powders, carbon flakes, carbon nanofibers or microfibres, and particulate graphite. The term "finely divided form" means that the longest dimension of any of the particles is suitably no more than 500 μm, preferably no more than 300 μm, more preferably no more than 50 μm. The carbon particles are preferably carbon black particles, for example, an oil furnace black such as Vulcan® XC72R (from Cabot Chemicals, USA), or an acetylene black such as Shawinigan® (from Chevron Chemicals, USA) or Denka FX- (from Denka, Japan). Suitable carbon microfibers include Pyrograf® PR19 carbon fibers (from Pyrograf Products).

Microporous layer A also contains a polymeric binder which is preferably a hydrophobic polymer. Being hydrophobic means that water has a contact angle with the surface of the polymer of no less than 90°, preferably no less that 100° at ambient temperature and pressure (e.g. about 22 to 25° C. and about 1 bar). Most preferably, the polymeric binder is a fluoropolymer. For example, a fluoropolymer such as polytetrafluoroethylene (PTFE) or fluorinated ethylene-propylene (FEP). Preferably, the fluoropolymer is PTFE e.g. PTFE AF1600 (from Sigma-Aldrich®, USA). The weight ratio of carbon particles to polymeric binder in microporous layer A is suitably no more than 50:1, preferably no more than 10:1. The weight ratio of carbon particles to polymeric binder in microporous layer A is preferably no less than 1:1, more preferably no less than 2:1. For example, the weight ratio of carbon particles to polymeric binder in microporous layer A may be about 4:1.

The loading of carbon particles in microporous layer A may be no more than 5 $mg/cm^2$, suitably no more than 2 $mg/cm^2$, preferably no more than 1.2 $mg/cm^2$, more preferably no more than 1.0 $mg/cm^2$. Preferably, the loading of carbon particles in microporous layer A is no less than 0.2 $mg/cm^2$, more preferably no less than 0.4 $mg/cm^2$. When a microporous layer A and a microporous layer B are present, it is particularly advantageous in terms of voltage produced at high current densities that the loading of carbon particles in microporous layer A is in the range of and including 0.4 to 1.0 $mg/cm^2$, in particular about 0.8 $mg/cm^2$.

Microporous layer A suitably has a thickness of no more than 100 μm, preferably no more than 50 μm, more preferably no more than 25 μm. The thickness of microporous layer A may be no less than 5 μm. The thickness of the microporous layer A is suitably uniform across the entire layer such that the thinnest portion of the layer is no less than 50% as thick as the thickest portion of the layer, preferably no less than 75% thick, more preferably no less than 90% as thick, most preferably no less than 95% as thick. Microporous layer A suitably covers the entire surface of the catalyst layer to which is it applied. Layer thickness can readily be determined from examination of cross sections in SEM images.

In the membrane electrode assembly of the invention, no less than 95%, preferably no less than 99%, for example about 100%, of the surface of microporous layer A is in contact with a surface of the catalyst layer. Put another way, the microporous layer A is in intimate contact with the catalyst layer such that there are no gaps between the microporous layer A and the catalyst layer. The polymeric binder helps to adhere the microporous layer A to the catalyst layer. Said surface of the catalyst layer is the surface which is opposite (e.g. through the thickness direction of the catalyst layer) to the surface which is closest to, preferably in contact with, the ion-conducting membrane.

Figure 2:
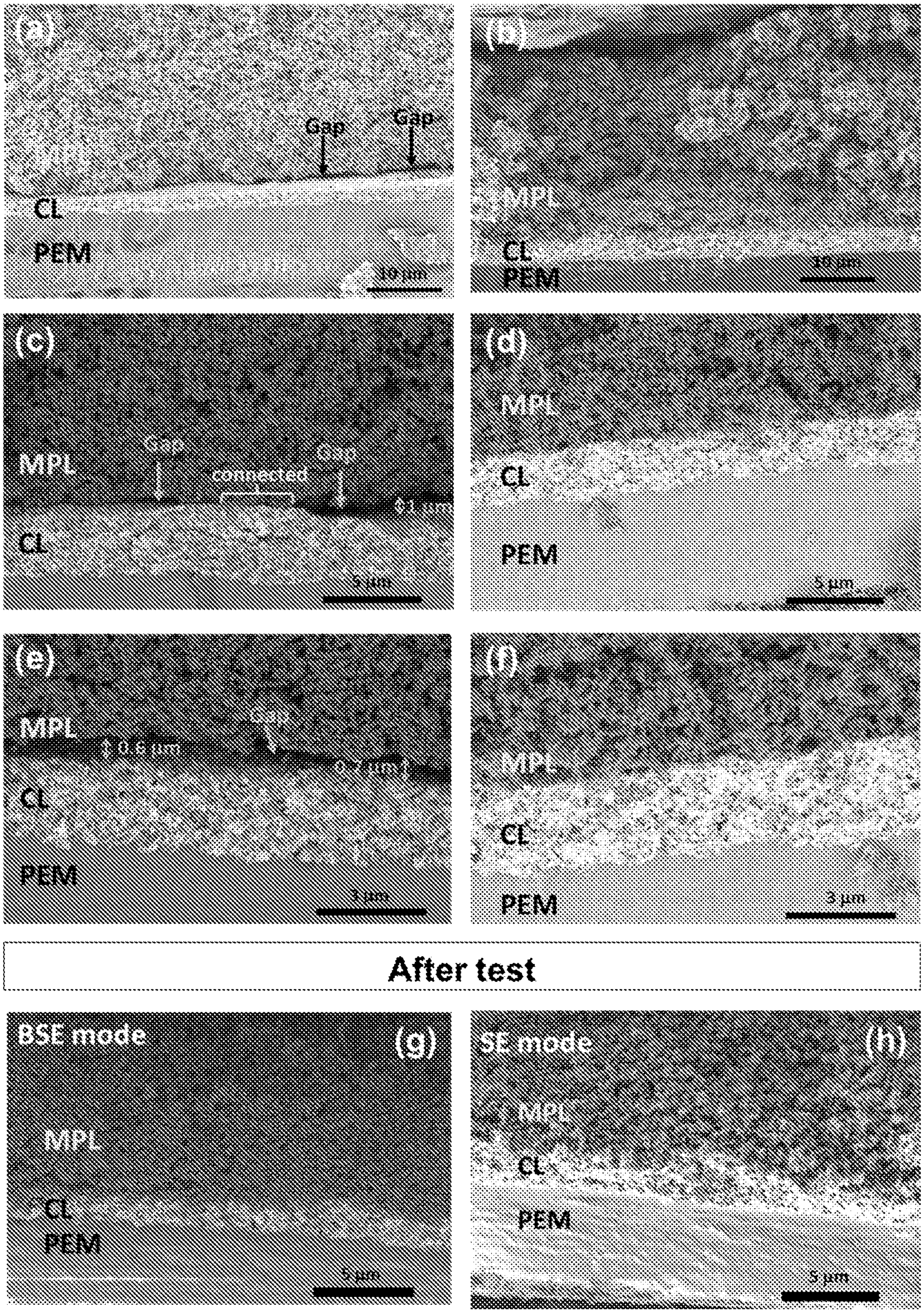
FIG. 2 shows scanning electron microscope (SEM) images of cathode catalyst layer|microporous layer interfaces. Images (a), (c), and (e) show conventional membrane electrode assemblies prepared by adding a microporous layer coated gas diffusion substrate to a catalyst coated ion-conducting membrane. Images (b), (d), and (f) show membrane electrode assemblies according to the invention in which a microporous layer A was applied to the catalyst coated membrane before subsequent addition of the gas diffusion substrate. Images (g) and (h) show that modified microporous layer A stays in contact with the catalyst layer after 40 hours of hot water exposure. MPL=microporous layer, CL=catalyst layer, and PEM=ion-conducting membrane.

Whether or not there are gaps between the microporous layer A and the catalyst layer can be assessed using SEM imaging, as demonstrated in FIG. 2. Images (a), (c), and (e) show conventional membrane electrode assemblies prepared by adding a microporous layer coated gas diffusion substrate to a catalyst coated ion-conducting membrane. Images (b), (d), and (f) show membrane electrode assemblies according to the invention in which a microporous layer A was applied to the catalyst coated ion-conducting membrane before subsequent addition of the gas diffusion substrate. Gaps can clearly be seen between the microporous layer and the catalyst layer in images (a), (c) and (e). These images also show that the size of the gaps can be measured. However, no gaps can be seen in images (b), (d) and (f). In the membrane electrode assembly of the invention, no gaps are seen when a statistically valid number of cross-section samples, for example greater than 10, preferably greater than 20, from different locations in the active area are assessed by SEM imaging. Accordingly, the requirement that no less than 95%, preferably no less than 99%, for example about 100%, of the surface of microporous layer A is in contact with a surface of the catalyst layer means that no gaps are seen when a statistically valid number of cross-section samples, for example greater than 10, preferably greater than 20, from different locations in the active area are assessed by SEM imaging.

As shown in images (g) and (h), gaps are still not present after 40 hours of hot water exposure which demonstrates the stability of the microporous layer Alcatalyst layer interface. In other words, the process of the invention has the advantage of strong bonding between the microporous layer A and the catalyst layer.

Step i) of the process of the invention involves preparing a dispersion A comprising carbon particles and a polymeric binder. As well as the carbon particles and polymeric binder, the dispersion also preferably comprises a non-polymeric fluorinated compound. Suitably, the non-polymeric fluorinated compound is a fluorinated alkane which is a liquid at ambient temperature and pressure (e.g. about 22 to 25° C. and about 1 bar). Preferably the compound is a perfluorinated alkane (i.e. a compound in which all of the hydrogen atoms in the parent alkane are substituted with fluorine atoms). The alkane preferable contains 6 to 10 carbon atoms, preferably 6 to 8 carbon atoms and is preferably linear. A preferred non-polymeric fluorinated compound is perfluorohexane, otherwise known as tetradecafluorohexane, e.g. FC-72® (from Acros Organics). Preferably, in step i) the polymeric binder is dissolved in the non-polymeric fluorinated compound prior to adding the carbon particles. The weight percent of polymeric binder in this solution is suitably no more than 5 wt %, preferably no more than 2 wt %, e.g. about 1 or about 2 wt %. The carbon particles are then preferably combined with the solution of polymeric binder in non-polymeric fluorinated compound to form a dispersion. Carbon particles are added such that the weight ratio of carbon particles to polymeric binder is suitably no more than 50:1, preferably no more than 10:1. Preferably the weight ratio is no less than 1:1, more preferably no less than 2:1. For example, the weight ratio of carbon particles to polymeric binder in the dispersion is about 4:1. Preferably, the dispersion also comprises a diluent. Suitable diluents include water, alcohol(s) or a mixture of water and alcohol(s). A suitable alcohol is propanol, preferably isopropanol. The amount of diluent added is not particularly limited but is typically in the range of and including 15 to 20 times the volume of the dispersion prior to addition of the solvent.

In step ii), the dispersion may be applied to the catalyst layer by any suitable printing technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application. Preferably, the dispersion is applied by spraying. Preferably, during application of the dispersion to the catalyst layer the catalyst coated ion-conducting membrane is heated, suitably to a temperature in the range of and including 80 to 120° C., for example about 90° C. to accelerate evaporation of the solvent. To form the microporous layer A, the catalyst coated ion-conducting membrane to which the dispersion has been applied is then preferably heated to a temperature of no more than 200° C. Preferably the temperature is no less than 100° C., more preferably no less than 150° C. The purpose of the heating step is to consolidate the polymeric binder. The heating step also helps adhere the microporous layer A to the catalyst layer. It is advantageous that the polymeric binder can be consolidated at a temperatures of no more than 200° C. Higher temperatures can result in degradation of the ion-conducting membrane. Accordingly, the microporous layer A can be applied to the catalyst coated ion-conducting membrane and achieve the benefits of the present invention, without damaging the ion-conducting membrane.

The gas diffusion substrates used in the invention are suitably conventional gas diffusion substrates used in membrane electrode assemblies. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from AvCarb Material Solutions LLC), or woven carbon cloths. Particularly suitable gas diffusion substrates are Sigracet®29BA and 29BC. The carbon paper, web or cloth may be provided with a pre-treatment prior to being added to the membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer.

A gas diffusion substrate may be applied directly to microporous layer A after step ii) of the process of the invention (i.e. step ii) a)). After application, the gas diffusion substrate and the microporous layer A are in contact, with no additional layers in between the gas diffusion substrate and microporous layer A. For example, no less than 90% of the surface of the gas diffusion substrate is in contact with the microporous layer A, preferably no less than 95%. After application of the gas diffusion substrate the assembly may suitably be hot pressed. Alternatively, hot pressing is not required and the assembly may, for example, be held together by cell pressure in a cell. The cell pressure may promote adhesion between the layers.

Alternatively, a microporous layer B is applied to the microporous layer A after step ii) such that the microporous layer A and the microporous layer B are in contact (i.e. step ii), b)), with no additional layers in between the microporous layer B and the microporous layer A. For example, no less than 90% of the surface of the microporous layer B is in contact with the microporous layer A, preferably no less than 95%. After application of the microporous layer B the assembly may suitably be hot pressed. Alternatively, hot pressing is not required and the assembly may, for example, be held together by cell pressure in a cell. The cell pressure may promote adhesion between the layers.

The composition of microporous layer B is not particularly limited. Microporous layer B may have the same or different composition to microporous layer A. It is an advantage of having two microporous layers that the properties of each layer can be tailored independently. The microporous layer B is suitably a conventional microporous layer containing carbon particles and a polymeric binder which is suitably a fluoropolymer such as polytetrafluoroethylene (PTFE) or fluorinated ethylene-propylene (FEP).

The microporous layer B can be applied to microporous layer A as an individual layer. In which case, a gas diffusion substrate may subsequently be applied to the microporous layer B. The microporous layer B may be applied to microporous layer A by applying an appropriate dispersion by any suitable printing technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application. Preferably, the dispersion is applied by spraying.

Alternatively, the microporous layer B can be applied to the microporous layer A in combination with a gas diffusion substrate as a gas diffusion layer. The manner in which microporous layer B is first applied to the gas diffusion substrate is not particularly limited and there are many methods known to a skilled person for doing so. For example, the microporous layer B may be applied to the gas diffusion substrate by techniques such as screen printing. Methods for applying microporous layers to gas diffusion substrates are disclosed in US 2003/0157397. Alternatively, a decal transfer method such as that disclosed in WO 2007/088396 could be employed. Gas diffusion layer Sigracet® 29BC of the Sigracet® series available from SGL Technologies GmbH is an example of a combination of a gas diffusion substrate and a microporous layer B.

The membrane electrode assembly of the invention comprises an ion-conducting membrane which comprises an ion-conducting polymer. Preferably, the ion-conducting membrane is proton conducting such that is can be used in a proton exchange membrane fuel cell. Accordingly, the ion-conducting membrane is preferably a proton exchange membrane and the ion-conducting polymer is a proton conducting polymer. Suitably, the ion-conducting material used in the present invention includes ionomers such as perfluorosulphonic acid (e.g. Nafion® (Chemours Company), Aciplex® (Asahi Kasei), Aquivion® (Solvay Specialty Polymer), Flemion® (Asahi Glass Co.)), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Aquivion® range available from Solvay, especially Aquivion® 790EW.

The ion-conducting membrane may comprise one or more hydrogen peroxide decomposition catalysts either as a layer on one or both faces of the membrane, or embedded within the membrane, either uniformly dispersed throughout or in a layer. Suitable hydrogen peroxide decomposition catalyst are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides, preferably cerium dioxide (ceria).

The ion-conducting membrane may optionally comprise a recombination catalyst, in particular a catalyst for the recombination of unreacted $H_2$ and $O_2$, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

The ion-conducting membrane may also comprise a reinforcement material, such as a planar porous material (for example expanded polytetrafluoroethylene (ePTFE) as described in USRE37307), embedded within the thickness of the membrane, to provide for improved mechanical strength of the membrane, such as increased tear resistance and reduced dimensional change on hydration and dehydration. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer. Graphene particles dispersed in an ion-conducting polymer layer may also be used as a reinforcement material.

The thickness of the ion-conducting membrane of the present invention is not particularly limited and will depend on the intended application of the membrane. For example, typical fuel cell ion-conducting membranes have a thickness of no less than 5 μm, suitably no less than 8 μm, preferably no less than 10 μm. Typical fuel cell ion-conducting membranes have a thickness of no more than 50 μm, suitably no more than 30 μm, preferably no more than 20 μm. Accordingly, typical fuel cell ion-conducting membranes have a thickness in the range of and including 5 to 50 μm, suitably 8 to 30 μm, preferably 10 to 20 μm.

The catalyst layer to which the microporous layer A is applied may be an anode or a cathode catalyst layer, preferably of a proton exchange membrane fuel cell. Preferably, the catalyst layer is a cathode catalyst layer.

Accordingly, the present invention provides a membrane electrode assembly comprising an ion-conducting membrane and, at the anode side of the membrane electrode assembly, a gas diffusion substrate, a microporous layer A comprising carbon particles and a polymeric binder, and an anode catalyst layer, wherein no less than 95% of a surface of microporous layer A is in contact with a surface of the anode catalyst layer.

Alternatively, the present invention provides a membrane electrode assembly comprising an ion-conducting membrane and, at the cathode side of the membrane electrode assembly, a gas diffusion substrate, a microporous layer A comprising carbon particles and a polymeric binder, and a cathode catalyst layer, wherein no less than 95% of a surface of microporous layer A is in contact with a surface of the cathode catalyst layer.

In this invention, a catalyst layer which is not in contact with a microporous layer A, i.e. the catalyst layer at the other side of the ion-conducting membrane form a catalyst layer that is in contact with a microporous layer A, is preferably in contact with a microporous layer which is in turn in contact with a gas diffusion substrate. The identities of these microporous layers and gas diffusion substrates are not particularly limited. Accordingly, the microporous layer suitably contains carbon particles and a polymeric binder which is suitably a fluoropolymer such as polytetrafluoroethylene (PTFE) or fluorinated ethylene-propylene (FEP). The gas diffusion substrate is suitably based on conventional gas diffusion substrates and typically comprises features as discussed above. This microporous layer and gas diffusion substrate are suitably applied to the catalyst layer in a conventional manner as a combination in a gas diffusion layer, and a skilled person will be readily aware of methods for combining the layers. For example, the assembly may suitably be hot pressed. Alternatively, hot pressing is not required and the assembly may, for example, be held together by cell pressure in a cell. The cell pressure may promote adhesion between the layers. The gas diffusion substrate and microporous layer can be applied before or after microporous layer A is applied to the catalyst layer at the other side of the ion-conducting membrane.

A microporous layer A may be applied to both the anode and the cathode catalyst layers of an ion-conducting membrane. Accordingly, the present invention also provides a process for preparing a membrane electrode assembly, said process comprising the steps of:

A) i) preparing a dispersion DA comprising carbon particles and a polymeric binder; then
 ii) applying the dispersion DA to the cathode catalyst layer of a catalyst coated ion-conducting membrane Y to form a first microporous layer A comprising the carbon particles and the polymeric binder on the cathode catalyst layer; then either
 a) applying a first gas diffusion substrate to the first microporous layer A after step ii); or
 b) applying a first microporous layer B to the first microporous layer A after step ii); and
B) i) preparing a dispersion DB comprising carbon particles and a polymeric binder; then
 ii) applying the dispersion DB to the anode catalyst layer of the catalyst coated ion-conducting membrane Y to form a second microporous layer A comprising the carbon particles and the polymeric binder on the anode catalyst layer; then either
 a) applying a second gas diffusion substrate to the second microporous layer A after step ii); or
 b) applying a second microporous layer B to the second microporous layer A after step ii).

The present invention also provides a membrane electrode assembly obtainable by this process, and a membrane electrode assembly comprising an ion-conducting membrane in which:

i) the cathode side of the membrane electrode assembly comprises a first gas diffusion substrate, a first microporous layer A comprising carbon particles and a polymeric binder, and a cathode catalyst layer, wherein no less than 95% of a surface of the first microporous layer A is in contact with a surface of the cathode catalyst layer; and ii) the anode side of the membrane electrode assembly comprises a second gas diffusion substrate, a second microporous layer A comprising carbon particles and a polymeric binder, and an anode catalyst layer, wherein no less than 95% of a surface of the second microporous layer A is in contact with a surface of the anode catalyst layer.

A catalyst layer in the invention comprises one or more electrocatalysts, accordingly, it may preferably be referred to as an electrocatalyst layer. The one or more electrocatalysts are independently a finely divided unsupported metal powder, or a supported electrocatalyst wherein small particles (e.g. nanoparticles) are dispersed on electrically conducting particulate carbon supports. The electrocatalyst metal is suitably selected from:

(i) the platinum group metals (platinum, palladium, rhodium, ruthenium, iridium and osmium);

(ii) gold or silver;

(iii) a base metal;

or an alloy or mixture comprising one or more of these metals or their oxides.

The exact electrocatalyst used will depend on the reaction it is intended to catalyse, and its selection is within the capability of the skilled person. The preferred electrocatalyst metal is platinum, which may be alloyed with other precious metals or base metals. The term "precious metals" as used herein will be understood to include the metals platinum, palladium, rhodium, ruthenium, iridium, osmium, gold and silver. The preferred alloying metal is a base metal, preferably nickel or cobalt.

Catalyst layers are suitably applied to a first and/or second face of an ion-conducting membrane to form a catalyst coated ion-conducting membrane as an ink, either organic or aqueous or a mixture of organic and aqueous (but preferably aqueous). The ink may suitably comprise other components, such as ion-conducting polymers as described in EP0731520, which are included to improve the ionic conductivity within the layer. Alternatively, the catalyst layer can be applied to the ion-conducting membrane by the decal transfer of a previously prepared catalyst layer.

The catalyst layers may also comprise additional components. Such components include, but are not limited to: a proton conductor (e.g. a polymeric or aqueous electrolyte, such as a perfluorosulphonic acid (PFSA) polymer (e.g. Nafion®), a hydrocarbon proton conducting polymer (e.g. sulphonated polyarylenes) or phosphoric acid); a hydrophobic (a polymer such as PTFE or an inorganic solid with or without surface treatment) or a hydrophilic (a polymer or an inorganic solid, such as an oxide) additive to control water transport.

The invention also provides a fuel cell comprising a membrane electrode assembly of the invention, which is preferably a proton exchange membrane fuel cell.

The invention will be further described with reference to the following examples which are illustrative and not limiting of the invention.

EXAMPLES

Preparation of Membrane Electrode Assemblies

Five different membrane electrode architectures were assembled:

Comparative Example 1: a membrane electrode assembly without a microporous layer on the cathode catalyst layer (e.g. FIG. 1(*a*)).

Comparative Example 2: a membrane electrode assembly with a microporous layer applied in a conventional manner to the cathode catalyst layer, e.g. by application of a pre-prepared combination of a gas diffusion substrate and a microporous layer to the cathode catalyst layer (e.g. FIG. 1(*b*)).

Comparative Example 3a: a membrane electrode assembly prepared by applying a pre-prepared combination of a gas diffusion substrate and two microporous layers (0.4 g/cm$^2$ carbon loading) to the cathode catalyst layer.

Comparative Example 3b: a membrane electrode assembly prepared by applying a pre-prepared combination of a gas diffusion substrate and two microporous layers (0.8 g/cm$^2$ carbon loading) to the cathode catalyst layer.

Example 1: a membrane electrode assembly with a microporous layer A having a carbon loading of 0.8 mg/cm$^2$ applied to the cathode catalyst layer prior to application of the gas diffusion substrate (e.g. FIG. 1(*c*)).

Example 2a: a membrane electrode assembly with a microporous layer A having a carbon loading of 0.4 mg/cm$^2$ applied to the cathode catalyst layer prior to application of the combination of a gas diffusion substrate and a microporous layer B (e.g. FIG. 1(*d*)).

Example 2b: a membrane electrode assembly with a microporous layer A having a carbon loading of 0.8 mg/cm$^2$ applied to the cathode catalyst layer prior to application of the combination of a gas diffusion substrate and a microporous layer B (e.g. FIG. 1(*d*)).

Example 2c: a membrane electrode assembly with a microporous layer A having a carbon loading of 1.0 mg/cm$^2$ applied to the cathode catalyst layer prior to application of the combination of a gas diffusion substrate and a microporous layer B (e.g. FIG. 1(*d*)).

Example 2d: a membrane electrode assembly with a microporous layer A having a carbon loading of 1.2 mg/cm$^2$ applied to the cathode catalyst layer prior to application of the combination of a gas diffusion substrate and a microporous layer B (e.g. FIG. 1(*d*)).

The catalyst coated ion-conducting membranes to which microporous layer A was applied (Examples 1 and 2 a-d) comprised 0.1 mgPtcm$^{-2}$ at the cathode, 0.04 mgPtcm$^{-2}$ at the anode, and a reinforced perfluorosulfonic acid-based membrane of 17 μm thickness. Microporous layer A was applied to the cathode catalyst layer by first mixing and dissolving 2% of PTFE AF 1600 (Sigma-Aldrich) granules in perfluoro-compound FC-72 (ACROS Organics, >90%). The diluted PTFE was then mixed with carbon particles (Vulcan XC72R (Cabot Co.)) such that the weight ratio of carbon particles to PTFE was 4:1. Subsequently, iso-propanol was added to dilute the dispersion. The dispersion was then spayed uniformly on the cathode side of the catalyst coated ion-conducting membrane until the desired microporous carbon layer loading was achieved (i.e. 0.4, 0.8, 1.0 or 1.2 g/cm$^2$). The modified catalyst coated ion-conducting membranes were heat-treated at 165° C. for 30 minutes to consolidate the PTFE and produce a microporous layer A on the cathode of the catalyst coated ion-conducting membrane.

Then, either a Sigracet® 29BA gas diffusion media (which comprises a non-woven carbon paper gas diffusion substrate and no microporous layer) was applied to the microporous layer A at the cathode side (Example 1), or a Sigracet® 29BC gas diffusion media (which comprises a non-woven carbon paper gas diffusion substrate and a PTFE based microporous layer) was applied to the microporous layer A at the cathode side (Examples 2a-d).

In Comparative Example 1, which does not contain a microporous layer A, a Sigracet® 29BA gas diffusion media was applied directly to the cathode catalyst layer. In Comparative Example 2, which does not contain a microporous layer A, a Sigracet® 29BC gas diffusion media was applied directly to the cathode catalyst layer. In Comparative Examples 3a and 3b, which also do not contain a microporous layer A but in which two microporous layers B are present, a microporous layer containing the desired loading of carbon particles (Vulcan XC72R (Cabot Co.)) was applied to a Sigracet® 29BC gas diffusion media to form a gas diffusion layer, which was then applied to the cathode catalyst layer.

All samples were combined with a Sigracet® 29BC gas diffusion media at the anode to complete the membrane electrode assembly structure. The membrane electrode assembly was held together by cell pressure, which improves layer binding.

Microscopy Images

Samples for cross-sectional scanning electron microscope (SEM) imaging were prepared by the cyro-fracturing technique. All images were taken using a dual beam FEI Helios Nanolab 650 scanning electron microscope operating with a beam voltage of 2 kV and an emission current of 0.2 nA.

Adhesion Test

The samples were placed in a TP5 cell (Tandem Technologies) compressed at 100 Psi with hot water (80° C.) flowing over the cathode for 40 hrs. The interfaces were observed with SEM to determine the effect of long-term hot water exposure on the microporous layer catalyst layer adhesion.

Membrane Electrode Assembly Fabrication and Testing

For testing, a membrane electrode assembly with an active area of 14 $cm^2$ (7 cm×2 cm) was placed in a TP50 cell (100 psi compression) with counter-flow single serpentine flow fields. The humidity and pressure of the gases were maintained at 100% and 100 kPag, respectively. The cell was operated at 80° C. All membrane electrode assemblies were conditioned for six hours (80° C., 500 mA $cm^{-2}$). Three different baseline membrane electrode assembly samples (i.e. Comparative Example 2) were assembled and tested (at the beginning, middle, and end of the testing period) to determine the repeatability and consistency of fuel cell performance. CV tests were done across the potential window of 0-1.2 vs. standard hydrogen electrode using pure humidified $H_2$ on the anode and pure humidified $N_2$ on the cathode side of the cell ($H_2$ and $N_2$ flow rates=0.1 and 1 NLPM, respectively).

Results and Discussion

Figure 3:
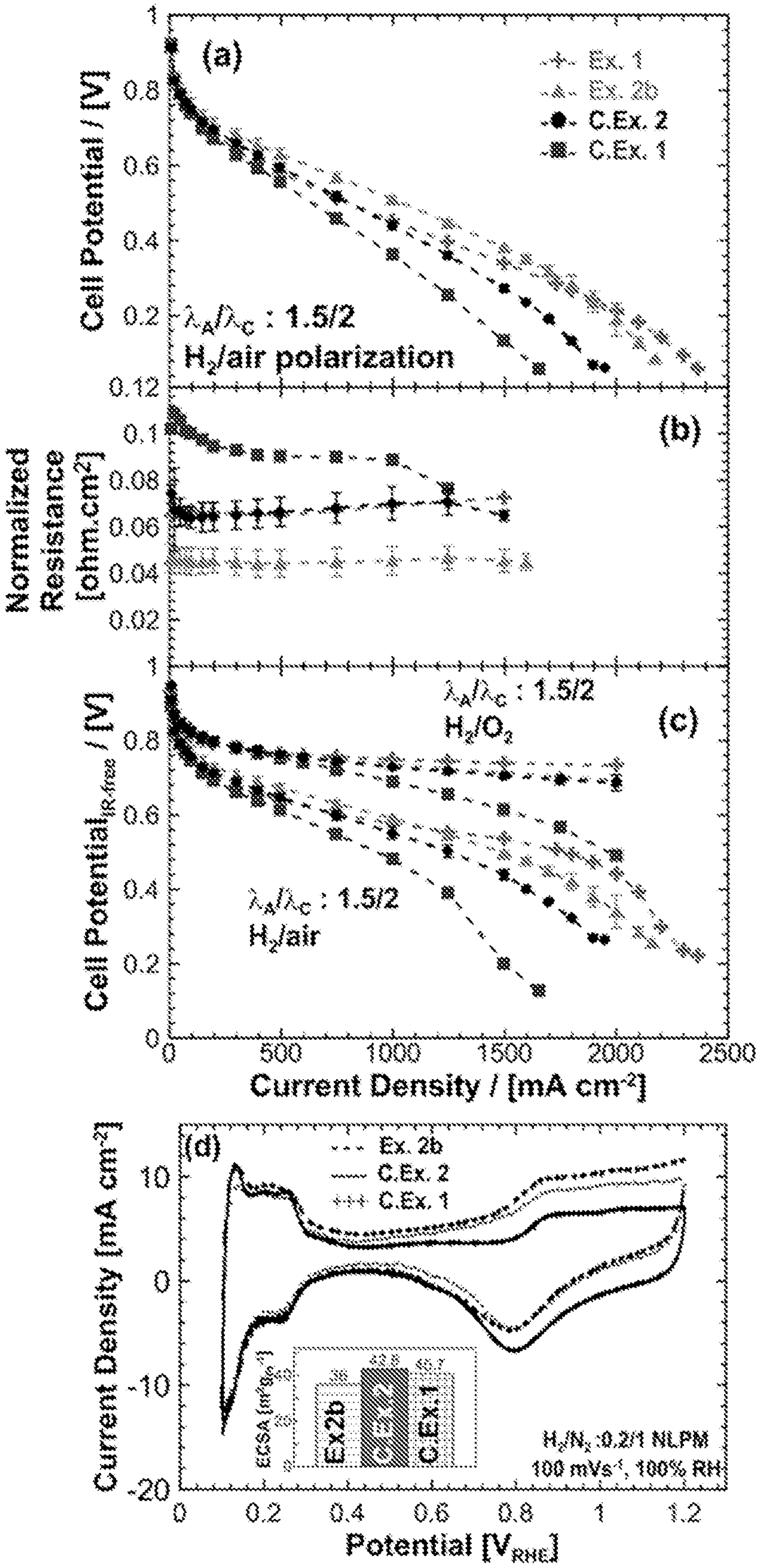
FIG. 3(*a*) is a plot showing voltage vs current density for membrane electrode assemblies according to the invention, as well as comparative membrane electrode assemblies, under $H_2$/air and fully humidified conditions.

The presence of a conventional microporous layer pre-adhered to the gas diffusion substrate in a conventional membrane electrode assembly (Comparative Example 2) reduces the membrane electrode assembly resistance from ~90 to ~65 mΩ$cm^2$ (FIG. 3(*b*)) compared to a membrane electrode assembly without a microporous layer (Comparative Example 1, e.g. as represented by FIG. 1 (*a*)) leading to a better overall polarization performance (see FIG. 3(*a*)). The reduction in resistance is believed to be due to an increased contact area at the catalyst layer|microporous layer interface compared to that of the catalyst layer|gas diffusion substrate interface.

Example 1 performs even better than Comparative Example 2 at high current density (>1 A $cm^{-2}$, see FIG. 3(*a*)). Accordingly, the application of a microporous layer A to the cathode catalyst layer has the benefit of providing improved performance at high current densities. There is also a benefit when microporous layer A is used in conjunction with a microporous layer B (Example 2, e.g. FIG. 1(*d*)). In particular, Example 2b shows an additional performance gain at high current densities (see FIG. 3(*a*)). This combined microporous layer architecture also further minimizes ohmic losses from ~65 to ~45 mΩ$cm^2$ (see FIG. 3(*b*)). Accordingly, there are benefits of improved performance at high current densities when a microporous layer A is used in conjunction with a microporous layer B.

SEM images of the microporous layer|catalyst layer interfaces fabricated by the conventional method (e.g. Comparative Example 2) show a noticeable gap of up to 1 μm even after 100 psi compression as illustrated in FIGS. 2(*a*), (*c*), and (*e*). The presence of these gaps leads to a non-uniform and disconnected interface region. The non-mating surface roughness between the catalyst layer and the microporous layer results in interfacial gaps which can be filled by liquid water during higher current density operation. On the other hand, application of a microporous layer A onto the catalyst layer in accordance with the invention results in negligible interfacial gaps since the microporous layer A surface contours follows the contours of the catalyst layer (FIGS. 2(*b*), (*d*), and (*f*)). Durability of this architecture was examined using the Adhesion test. The microporous layer A remains intact as shown in FIGS. 2(*g*) and (*h*). This shows that the structure maintains excellent stability even after an unusually harsh test.

Figure 4:
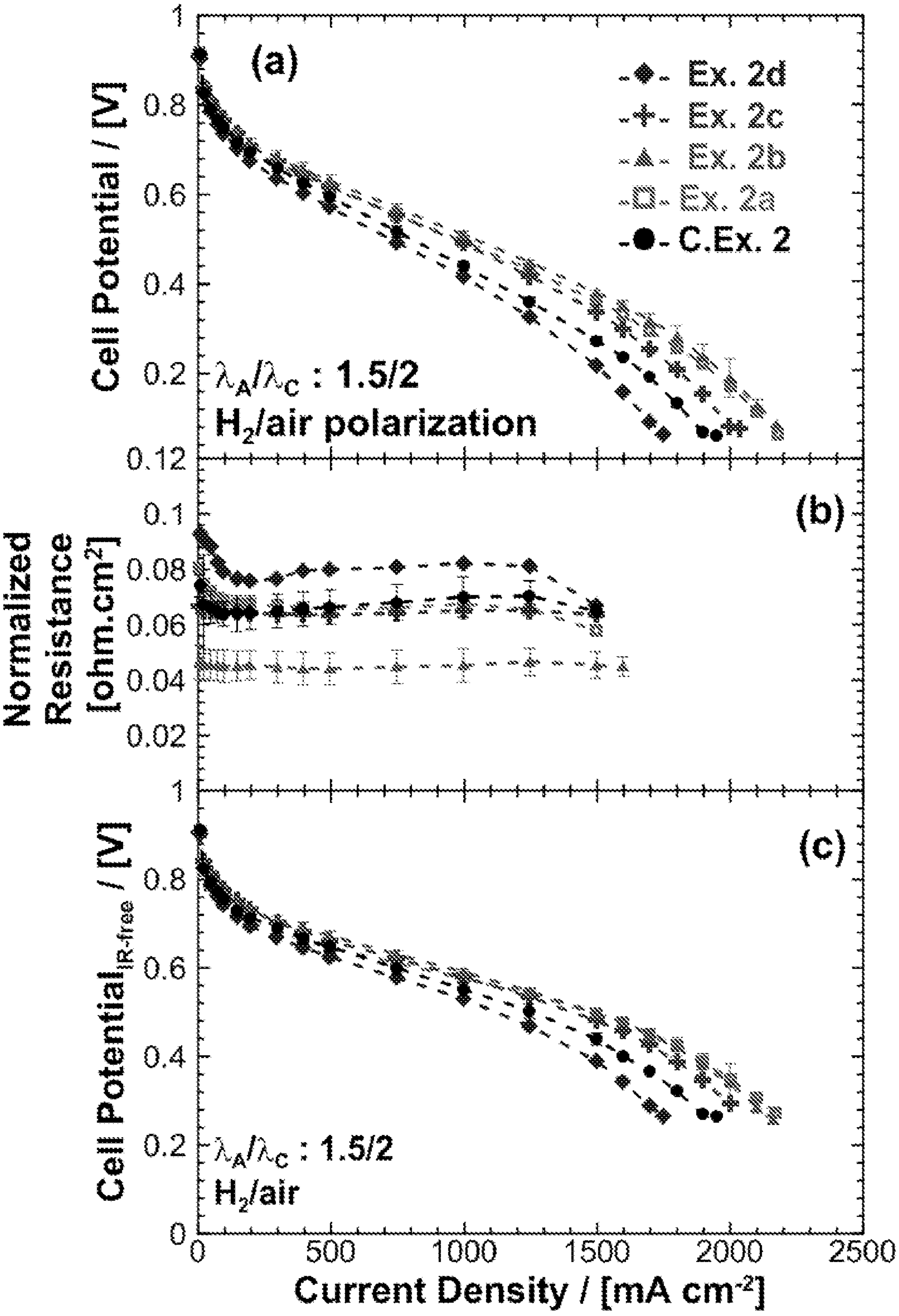
FIG. 4(*a*) is a plot showing voltage vs current density for membrane electrode assemblies according to the invention, as well as a comparative membrane electrode assembly, under $H_2$/air and fully humidified conditions. The membrane electrode assemblies according to the invention have two microporous layers A and B, and the carbon loading in the microporous layer A is varied.

Membrane electrode assemblies with 0.4, 0.8, 1.0 and 1.2 mg/$cm^2$ carbon in the microporous layer A, paired with a microporous layer B, were prepared (Examples 2a, b, c, and d respectively). The polarization results and resistance measurements are shown in FIGS. 4(*a*), 4(*b*) and 4(*c*). Optimal performance is seen with carbon loadings in the range of from 0.4 to 1.0 mg/$cm^2$ in the microporous layer A.

Figure 5:
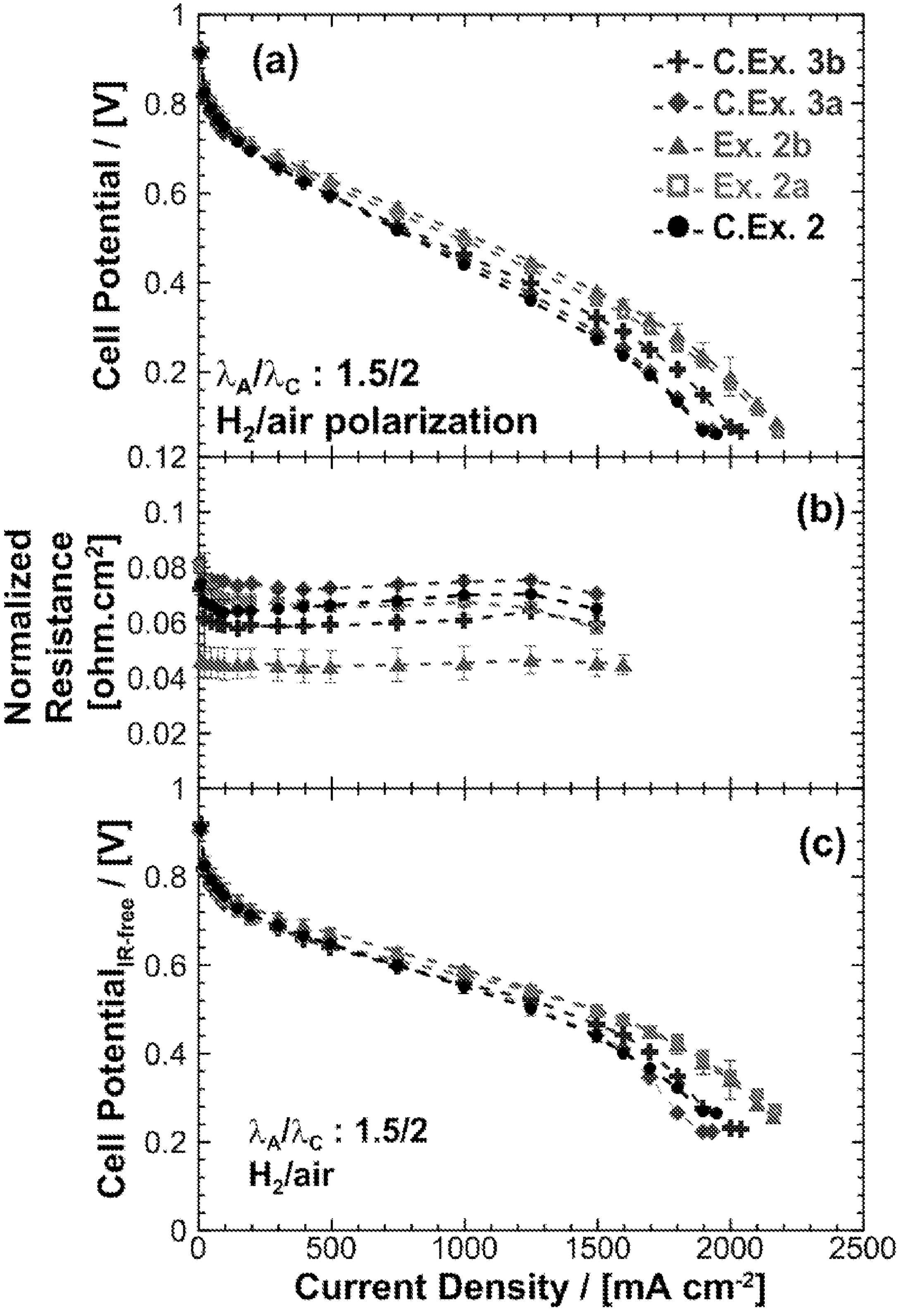
FIG. 5(*a*) is a plot showing voltage vs current density for membrane electrode assemblies according to the invention, as well as a comparative membrane electrode assembly, under $H_2$/air and fully humidified conditions. The membrane electrode assemblies according to the invention have two microporous layers A and B.

It was also confirmed that the beneficial effect of having two microporous layers, layer A and layer B, at the cathode catalyst layer relies on the presence of a microporous layer A applied to the cathode catalyst layer in accordance with the invention. Membrane electrode assemblies were prepared by applying the combination of a gas diffusion substrate and two microporous layers B to the cathode catalyst layer (Comparative Examples 3a and 3b). The polarization results and resistance measurements for Comparative Examples 3a and 3b, Examples 2a and 2b, and Comparative Example 2 are shown in FIGS. 5(*a*) and 5(*b*). The largest performance benefit arises with Examples 2a and 2b, showing that the beneficial effect is dependent on the presence of a microporous layer A applied to the cathode catalyst layer.

Tests under $H_2/O_2$ were performed to examine the kinetic effect of having two microporous layers (A and B) at the cathode catalyst layer (Example 2b). FIG. 3(*c*) shows similar polarization performance (after correction for internal resistance) between Example 2b and Comparative Example 2 indicating a negligible effect of the additional layer on kinetic performance. Likewise, cyclic voltammograms performed under $H_2/N_2$ (FIG. 3(*d*)) also suggest no significant catalyst utilization drop (<5%, e.g. the voltammograms have a similar appearance).

REFERENCES

[1] G. Lin, T. Van Nguyen, *J. Electrochem. Soc.* 2005, 152, A1942.
[2] M. Baghalha, *ECS Trans.* 2011, 33, 521-538.
[3] M. Blanco, D. P. Wilkinson, *Int. J. Hydrogen Energy* 2014, 39, 16390-16404.
[4] J. H. Nam, K. J. Lee, G. S. Hwang, C. J. Kim, M. Kaviany, *Int. J. Heat Mass Transf.* 2009, 52, 2779-2791.
[5] F. Chen, M. H. Chang, P. T. Hsieh, *Int. J. Hydrogen Energy* 2008, 33, 2525-2529.
[6] Z. Lu, M. M. Daino, C. Rath, S. G. Kandlikar, *Int. J. Hydrogen Energy* 2010, 35, 4222-4233.
[7] F. E. Hizir, S. O. Ural, E. C. Kumbur, M. M. Mench, *J. Power Sources* 2010, 195, 3463-3471.
[8] T. Swamy, F. E. Hizir, M. M. Mench, M. Khandelwal, E. C. Kumbur, *ECS Trans.* 2009, 25, 15-27.
[9] Y. Aoyama, K. Suzuki, Y. Tabe, T. Chikahisa, T. Tanuma, *J. Electrochem. Soc.* 2016, 163, F359-F366.
[10] Y. Aoyama, K. Suzuki, Y. Tabe, T. Chikahisa, T. Tanuma, *ECS Trans.* 2013, 84, 487-492.
[11] A. R. Kalidindi, R. Taspinar, S. Litster, E. C. Kumbur, *Int. J. Hydrogen Energy* 2013, 38, 9297-9309.
[12] T. Swamy, E. C. Kumbur, M. M. Mench, *J. Electrochem. Soc.* 2009, 157, B77.
[13] H. Bajpai, M. Khandelwal, E. C. Kumbur, M. M. Mench, *J. Power Sources* 2010, 195, 4196-4205.

[14] S. Y. Lin, M. H. Chang, *Int. J. Hydrogen Energy* 2015, 40, 7879-7885.

[15] A. M. Kannan, A. Menghal, I. V. Barsukov, *Electrochem. commun.* 2006, 8, 887-891.

[16] S. Park, J. W. Lee, B. N. Popov, *J. Power Sources* 2008, 177, 457-463.

[17] J. Lee, R. Yip, P. Antonacci, N. Ge, T. Kotaka, Y. Tabuchi, A. Bazylak, *J. Electrochem. Soc.* 2015, 162, F669-F676.

[18] X. Wang, S. Chen, Z. Fan, W. Li, S. Wang, X. Li, Y. Zhao, T. Zhu, X. Xie, *Int. J. Hydrogen Energy* 2017, 42, 29995-30003.

[19] M. P. Manahan, M. C. Hatzell, E. C. Kumbur, M. M. Mench, *J. Power Sources* 2011, 196, 5573-5582.

[20] D. Gerteisen, C. Sadeler, *J. Power Sources* 2010, 195, 5252-5257.

The invention claimed is:

1. A process for preparing a membrane electrode assembly, said process comprising the steps of:

i) preparing a dispersion comprising carbon particles and a hydrophobic polymeric binder; then ii) applying the dispersion directly to a catalyst layer of a catalyst coated ion-conducting membrane to form a microporous layer A comprising the carbon particles and the polymeric binder on the catalyst layer, wherein a loading of the carbon p articles in the microporous layer A is 0.4 to 1.0 mg/cm$^2$; then either a) applying a gas diffusion substrate to the microporous layer A after step ii); or b) applying a microporous layer B to the microporous layer A after step ii).

2. The process according to claim 1, wherein step ii) is carried out by spraying the dispersion on to the catalyst layer.

3. The process according to claim 1, wherein the catalyst layer is a cathode catalyst layer.

4. The process according to claim 1, wherein the composition of microporous layer A is different from the composition of microporous layer B.

5. The process according to claim 1, wherein the hydrophobic polymer is a fluoropolymer.

6. The process according to claim 1, wherein the dispersion also comprises a non-polymeric fluorinated compound.

7. The process according to claim 1, wherein the dispersion also comprises a diluent.

8. The process according to claim 1, wherein the microporous layer A contains no more than 0.8 mg/cm$^2$ of carbon particles.

9. The process according to claim 1, wherein in step b), the microporous layer B is applied as a combination with a gas diffusion substrate.

* * * * *